United States Patent
Lin (10) Patent No.: US 11,692,936 B2
(45) Date of Patent: Jul. 4, 2023

(54) BIOLOGICAL SENSING APPARATUS, BIOLOGICAL SENSING SYSTEM, AND METHOD OF USING THE SAME

(71) Applicant: MING CHUAN UNIVERSITY, Taipei (TW)

(72) Inventor: Yu-Cheng Lin, Taipei (TW)

(73) Assignee: MING CHUAN UNIVERSITY, Taipei (TW)

( * ) Notice: Subject to any disclaimer, the term of this patent is extended or adjusted under 35 U.S.C. 154(b) by 147 days.

(21) Appl. No.: 17/308,693

(22) Filed: May 5, 2021

(65) Prior Publication Data

US 2022/0357488 A1   Nov. 10, 2022

(51) Int. Cl.
*G01N 21/25* (2006.01)
*G01N 21/552* (2014.01)
*G02B 6/122* (2006.01)
*G01N 21/77* (2006.01)

(52) U.S. Cl.
CPC ....... *G01N 21/553* (2013.01); *G01N 21/7703* (2013.01); *G02B 6/1226* (2013.01); *G01N 2021/258* (2013.01)

(58) Field of Classification Search
CPC .......... G01N 21/553; G01N 2021/258; G01N 2021/7703; G02B 6/1226
See application file for complete search history.

(56) References Cited

U.S. PATENT DOCUMENTS

| | | | |
|---|---|---|---|
| 10,725,373 B1 * | 7/2020 | Kumar | G02B 1/02 |
| 2009/0103099 A1 * | 4/2009 | Debackere | B82Y 20/00 356/244 |
| 2021/0123866 A1 * | 4/2021 | Lin | G02B 6/26 |

(Continued)

FOREIGN PATENT DOCUMENTS

| | | | |
|---|---|---|---|
| CN | 109764976 A | | 5/2019 |
| CN | 209356087 U | * | 9/2019 |
| TW | 201142290 A | | 12/2011 |

OTHER PUBLICATIONS

Del Villar, et al., "Optical sensors based on lossy-mode resonances", 2017, Sensors and Actuators B, 240, pp. 174-185 (Year: 2017).*

(Continued)

*Primary Examiner* — Daniel Petkovsek
(74) *Attorney, Agent, or Firm* — Chun-Ming Shih; HDLS IPR Services (57) ABSTRACT

A biological sensing apparatus includes an optical waveguide substrate, a surface plasmon resonance (SPR) layer, and a lossy mode resonance (LMR) layer. The optical waveguide substrate includes a light input end and a light output end opposite to each other, and a biological sensing area is formed on one surface of the optical waveguide substrate between the light input end and the light output end. The SPR layer includes a metal layer and a plurality of biological probes. The metal layer is arranged on part of the biological sensing area, and the plurality of biological probes are evenly arranged on the metal layer. The LMR layer is arranged on part of the biological sensing area, and the LMR layer and the SPR layer are not overlapped. The present disclosure further includes a biological sensing system and a method of using the same.

9 Claims, 5 Drawing Sheets

(56) References Cited

U.S. PATENT DOCUMENTS

2021/0172941 A1* 6/2021 Lin .................... G01N 21/0332
2022/0236484 A1* 7/2022 Liu .................... G02B 6/12007

OTHER PUBLICATIONS

Rivero, et al., "Optical fiber humidity sensors based on Localized Surface Plasmon Resonance (LSPR) and Lossy-mode resonance (LMR) in overlays loaded with silver nanoparticles", 2012, Sensors and Actuators B, 173, pp. 244-249 (Year: 2012).*
Rivero et al., "Optical Fiber Humidity Sensors Based on Localized Surface Plasmon Resonance (LSPR) and Lossy-mode Resonance (LMR) in Overlays Loaded with Silver Nanoparticles", Sensors and Actuators B 173, 2012, pp. 244-249 (Year: 2012).*

* cited by examiner

BIOLOGICAL SENSING APPARATUS, BIOLOGICAL SENSING SYSTEM, AND METHOD OF USING THE SAME

BACKGROUND

Technical Field

The present disclosure relates to a biological sensing apparatus, a biological sensing system, and a method of using the same, and more particularly to a biological sensing apparatus, a biological sensing system, and a method of using the same that are based on the principle of lossy mode resonance (LMR) and environmental interference signals may be instantly removed.

Description of Related Art

The statements in this section merely provide background information related to the present disclosure and do not necessarily constitute prior art.

The life style of human beings changes with the development of the country and society. In the era of rapid technological development and convenient medical services, many countries have never developed into developing stage countries or developed stage countries, enjoying the convenience brought by technology is no longer a dream. The distance between countries is no longer a distance, no matter industry, information, culture and food. But with the convenience of life and longevity, civilized diseases have also emerged, such as heart disease, cancer, obesity, and diabetes. Taking diabetes as an example, the main symptom is that the patient's blood sugar is higher than the standard value for a long time. Normally, when the body's blood sugar rises, it should be controlled by insulin to lower blood sugar. In the diabetes test, glycosylated hemoglobin (HbA1c) may be tested for the basis of blood glucose status for nearly 3 months.

In the past few years of bio-detection technology, surface plasmon resonance (SPR) technology has made great progress, and its high sensitivity makes it widely used in the biological and chemical fields for molecular grade detection. In many researches works, an SPR sensor is constructed by using a high refractive index prism. The angle of an incidence light has widely adjustable range. Therefore, any medium and the object to be tested may find a suitable angle to excite the surface plasma, and the incident light undergoes total internal reflection (TIR) at the interface between a waveguide and a resonance film and generates an evanescent wave. An incident light includes a transverse electronic (TE) wave and transverse magnetic (TM) waves, SPR technology may only excite the TM wave.

However, the sensor architecture using the prime-type design usually has a large volume, requires expensive optical equipment (such as lens group) and precision mechanical equipment (such as optical table systems), and is not easy to achieve miniaturization and mass production. In addition, there are two types of resonance wavelength shift in a detection process using SPR technology. One type of resonance wavelength shift (hereinafter referred to as biological signal) is caused when biomolecules are grabbed (or adsorbed) to a surface to be measured, and the other type of resonance wavelength shift (hereinafter referred to as environmental interference signal) is caused by changes in the refractive index of the liquid caused by temperature fluctuations, or caused by disturbances in the light source. The environmental interference signal and the biological signal aforementioned will be superimposed on each other to cause signal distortion, inaccurate biological sensing results are caused.

Therefore, how to design a biological sensing apparatus, a biological sensing system, and a method of using the same to solve the technical problems above is an important subject studied by the inventors and proposed in the present disclosure.

SUMMARY

A purpose of the present disclosure is to provide a biological sensing apparatus, a biological sensing system, and a method of using the same, which can avoid the use of a prime with huge volume and instantly remove environmental interference signals. Therefore, the technical problems in prior art about miniaturization not easy to achieve and signal distortion easy to cause are solved, and the purpose of convenient portability, easy mass production, and accurate biological sensing results is achieved.

In order to achieve the purpose above-mentioned, the biological sensing apparatus includes an optical waveguide substrate, a surface plasmon resonance (SPR) layer, and a lossy mode resonance (LMR) layer. The optical waveguide substrate includes a light input end and a light output end opposite to each other, and a biological sensing area is formed on one surface of the optical waveguide substrate between the light input end and the light output end. The SPR layer includes a metal layer and a plurality of biological probes. The metal layer is arranged on part of the biological sensing area, and the plurality of biological probes are evenly arranged on the metal layer. The LMR layer is arranged on part of the biological sensing area, and the LMR layer and the SPR layer are not overlapped. The plurality of biological probes is formed on the metal layer through self-assembly after the metal layer is surface modified.

Further, in the biological sensing apparatus, the biological sensing area is sequentially formed a first area and a second area along a direction from the light input end to the light output end, the SPR layer is arranged on the first area, and the LMR layer is arranged on the second area.

Further, in the biological sensing apparatus, the LMR layer is formed of metal oxide or polymer material.

Further, in the biological sensing apparatus, the optical waveguide substrate is one of glass, quartz and polymer material.

In order to achieve the purpose above-mentioned, the biological sensing system includes a broadband light source, an input optical fiber, a biological sensing apparatus, an output optical fiber, and a spectrometer. The input optical fiber is coupled to the broadband light source. The biological sensing apparatus is coupled to the input optical fiber, and the biological sensing apparatus includes an optical waveguide substrate, a surface plasmon resonance (SPR) layer, and a lossy mode resonance (LMR) layer. The optical waveguide substrate includes a light input end and a light output end opposite to each other, and a biological sensing area is formed on one surface of the optical waveguide substrate between the light input end and the light output end. The SPR layer includes a metal layer and a plurality of biological probes. The metal layer is arranged on part of the biological sensing area, and the plurality of biological probes are evenly arranged on the metal layer. The LMR layer is arranged on part of the biological sensing area, and the LMR layer and the SPR layer are not overlapped. The output optical fiber is coupled to the light output end. The spectrometer is coupled to the output optical fiber. The plurality of biological probes is formed on the metal layer through self-assembly after the metal layer is surface modified. An incident light emitted by the broadband light source enters the optical waveguide substrate through the input optical fiber for LMR in the biological sensing area.

Further, in the biological sensing system, the biological sensing area sequentially is formed a first area and a second area along a direction from the light input end to the light output end. The SPR layer is arranged on the first area, and the LMR layer is arranged on the second area.

Further, in the biological sensing system, the LMR layer is formed of metal oxide or polymer material.

In order to achieve the purpose above-mentioned, the method of using a biological sensing system includes the following steps: An object is arranged on a biological sensing area including a surface plasmon resonance (SPR) layer and a lossy modal resonance (LMR) layer are side by side and are not overlapped, and the object simultaneously contacts with the SPR layer and the LMR layer. An incident light emitted by a broadband light source inputs to the biological sensing area, the incident light generates an SPR signal on the SPR layer, and simultaneously the incident light generates an LMR signal on the LMR layer. A spectrometer receives the SPR signal and the LMR signal simultaneously, and subtracting the LMR signal from the SPR signal to obtain a biological signal.

Further, the SPR layer includes a metal layer and a plurality of biological probes, the plurality of biological probes is formed on the metal layer through self-assembly after the metal layer is surface modified.

Further, in the method of using a biological sensing system, the biological sensing area is sequentially formed a first area and a second area along a transmission direction of the incident light. The SPR layer is arranged on the first area, and the LMR layer is arranged on the second area. The LMR layer is formed of metal oxide or polymer material.

When using the biological sensing apparatus, the biological sensing system, and the method of using the same, the structure of the SPR layer and the LMR layer on the optical waveguide substrate is used to form the biological sensing area, so as to avoid using a prime with huge volume. Further, the biological sensing area obtains an SPR signal through the SPR layer, and simultaneously obtains an LMR signal through the LMR layer. Afterward, the spectrometer subtracts the LMR signal from the SPR signal to obtain the biological signal, which may instantly remove the environmental interference signal. Therefore, the technical problems in prior art about miniaturization not easy to achieve and signal distortion easy to cause are solved.

For this reason, the biological sensing apparatus, the biological sensing system, and the method of using the same of the present disclosure achieve the purpose of convenient portability, easy mass production, and accurate biological sensing results.

In order to further understand the techniques, means, and effects of the present disclosure for achieving the intended purpose. Please refer to the following detailed description and drawings of the present disclosure. The drawings are provided for reference and description only, and are not intended to limit the present disclosure.

DETAILED DESCRIPTION

The technical content and detailed description of the present disclosure will be described below in conjunction with the drawings.

Figure 1:
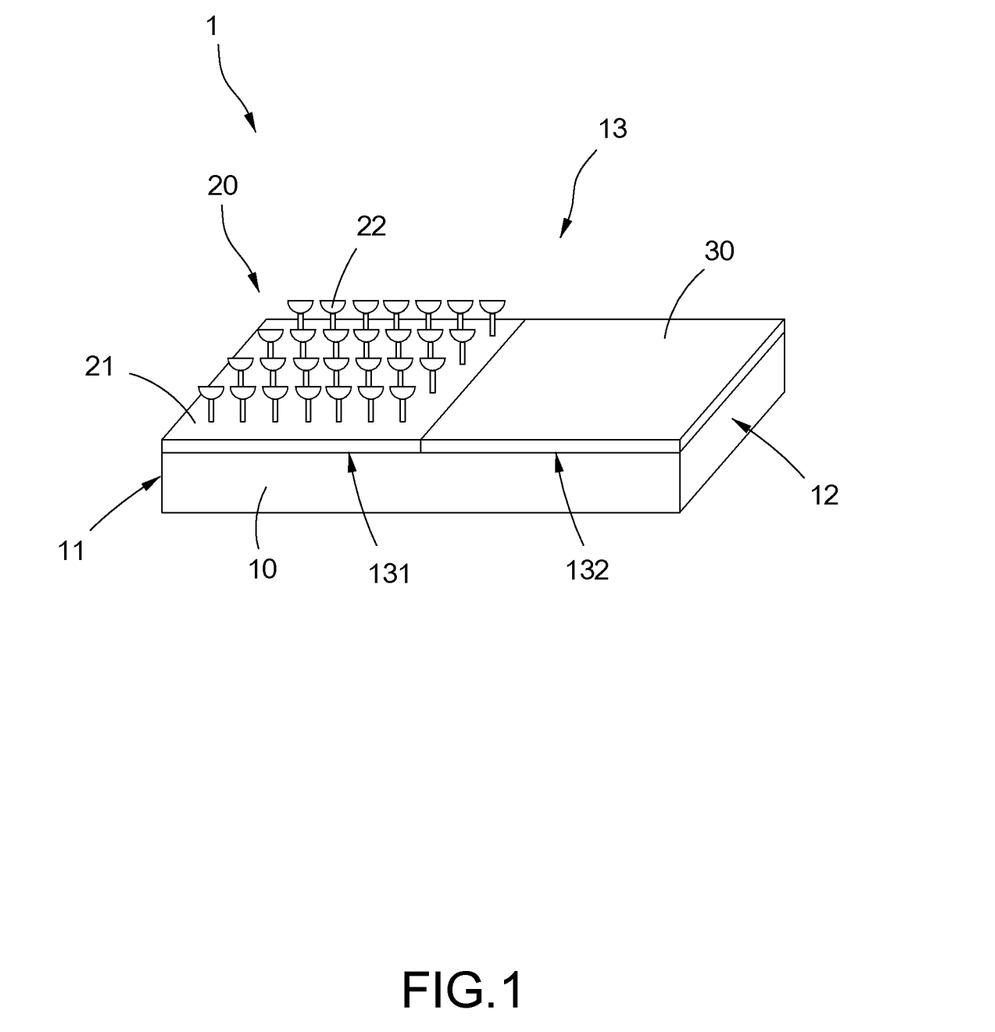
FIG. 1 is a schematic structure diagram of a biological sensing apparatus of the present disclosure.
Figure 2:
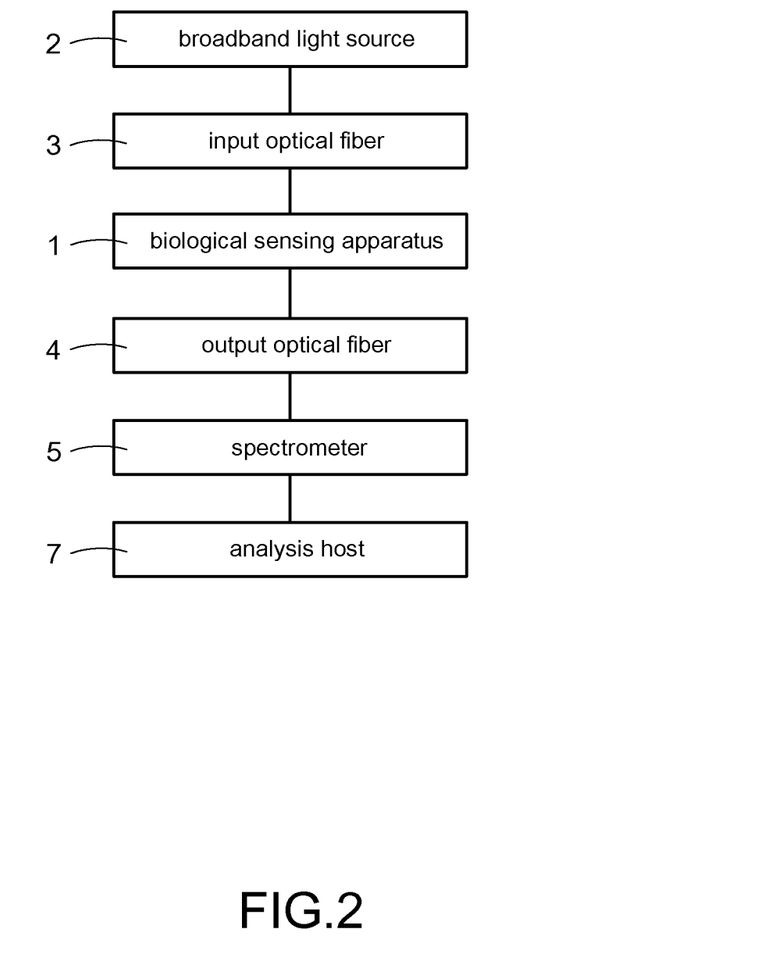
FIG. 2 is a functional block diagram of a biological sensing system of the present disclosure.

Please refer to the FIG. 1 and FIG. 2. FIG. 1 is a schematic structure diagram of a biological sensing apparatus of the present disclosure. FIG. 2 is a functional block diagram of a biological sensing system of the present disclosure.

An embodiment of the biological sensing apparatus 1 of the present disclosure may be applied to a protein detection, and the biological sensing apparatus 1 includes an optical waveguide substrate 10, a surface plasmon resonance (SPR) layer 20, and a lossy mode resonance (LMR) layer 30. The optical waveguide substrate 10 includes a light input end 11 and a light output end 12 opposite to each other, and a biological sensing area 13 is formed on one surface of the optical waveguide substrate 10 between the light input end 11 and the light output end 12. The biological sensing area 13 is used for placing a device under test (DUT), or call an object to be test. In the embodiment of the present disclosure, the object may be a phosphate buffer solution (PBS) containing glycosylated heme (HbA1c). In the embodiment of the present disclosure, the optical waveguide substrate 10 may be one of glass, quartz and other light-conducting materials as polymer materials (for example: polyethylene terephthalate (PET), poly methyl meth acrylate (PMMA), etc.), or may be made of other materials with low optical loss.

Although the optical fiber sensor is currently in the mainstream, a manufacturing process of the optical fiber sensor needs to be ground and coated, which is not easy to manufacture. Taking a plastic optical fiber (POF) as an example, although the toughness thereof is better, but it is difficult to resist the organic solution and high temperature in the process, and the wavelength range of the absorption spectrum of POF is between red light and infrared light. The absorption spectrum is a commonly used wavelength and is not easily used to determine SPR and LMR phenomena. Taking a glass optical fiber (GOF) as an example, although it may resist the organic solution and high temperature in the process, and the absorption spectrum is in ultraviolet light, and the ultraviolet light is not a commonly used wavelength, it is not easy to grind and is easy to break. In summary, the present disclosure proposes to use a planar waveguide base on glass as a sensor, and the glass substrate is first coated and then cut to an appropriate size. Glass may resist the organic solution and high temperature in the process, and does not need to be ground. Compared with the optical fiber sensor, the planar waveguide makes the sensor easier, is not easy to damage, and has high yield.

The SPR layer 20 includes a metal layer 21 and a plurality of biological probes 22. The metal layer 21 is arranged on part of the biological sensing area 13, and the plurality of biological probes 22 are evenly arranged on the metal layer 21. The plurality of biological probes 22 are formed on the metal layer 21 through self-assembly after the metal layer 21 is surface modified. The surface modification may carry out sequentially in the following first to fourth steps. The first step is to remove surface contaminants of an indium tin oxide layer. The second step is to carry out a hydroxylate treatment to the indium tin oxide layer. The third step is to carry out a silanization treatment to the indium tin oxide layer. The fourth step is to carry out a decarboxylate treatment for the indium tin oxide layer. Details are as follows.

The LMR layer 30 is arranged on part of the biological sensing area 13, and the LMR layer 30 and the SPR layer 20 are not overlapped. The LMR layer 30 may be selected a metal oxide such that the real part of the dielectric constant is much larger than the imaginary part of the dielectric constant, and there is an opportunity to generate a lossy mode. The LMR layer 30 may be composed of a metal oxide (one of indium tin oxide (ITO), titanium oxide ($TiO_x$), and zinc oxide ($ZnO_x$)) or a polymer material. The principle of LMR is similar to the principle of SPR. When an incident light enters the LMR layer 30 at a critical angle and total internal reflection (TIR) occurs, the incident light generates an evanescent wave on the surface of the LMR layer 30. When the evanescent wave is matched with the effective refractive index of the LMR layer 30, they are coupled to observe the light intensity loss of the partial wavelength from a spectrum of reflected light. The wavelength with loss of light intensity is called an LMR wavelength and is a focus of observation in the present disclosure. In addition, both TE wave and TM wave may resonate with the LMR layer 30, so there is no need to polarize or filter the incident light, and the sensitivity is high and the use is convenient. In the embodiment of the present disclosure, the indium tin oxide layer as the LMR layer 30 may dispose on the glass substrate as the optical waveguide substrate 10 by RF magnetron sputter. The RF magnetron sputter is well known and mature in the art and will not be described in detail herein.

Further, in the biological sensing apparatus 1, the biological sensing area 13 is sequentially formed a first area 131 and a second area 132 along a direction from the light input end 11 to the light output end 12. The SPR layer 20 is arranged on the first area 131, and the LMR layer 30 is arranged on the second area 132. That is the LMR layer 30 and the SPR layer 20 are not overlapped.

As shown in FIG. 2, the biological sensing system of the present disclosure may be based on the biological sensing apparatus 1, and further include a broadband light source 2, an input optical fiber 3, an output optical fiber 4, a spectrometer 5, and an analysis host 7. The input optical fiber 3 is coupled to the broadband light source 2 for transmitting the light output by the broadband light source 2, and the broadband light source 2 may be a halogen light source. The biological sensing apparatus 1 is coupled to the input optical fiber 3 to allow the light output from the broadband light source 2 to enter the light input end 11 of the optical waveguide substrate 10 as shown in FIG. 1. The output optical fiber 4 is coupled to the light output end 12 of the optical waveguide substrate 10 for receiving light output from the optical waveguide substrate 10. The spectrometer 5 is coupled to the output optical fiber 4 for receiving and analyzing the light output from the optical waveguide substrate 10. The light output from the optical waveguide substrate 10 may include light resonating in the SPR layer 20 and light resonating in the LMR layer 30. The analysis host 7 is coupled to the spectrometer 5.

Figure 3:
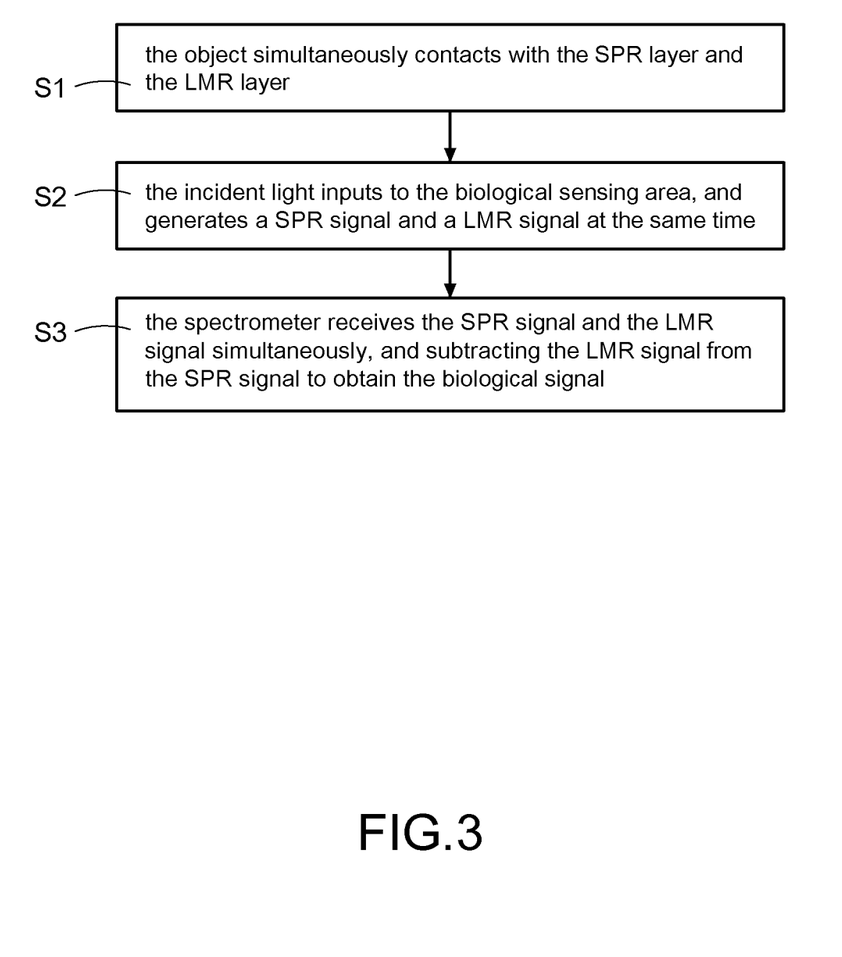
FIG. 3 is a flowchart of a method of using the biological sensing system of the present disclosure.
Figure 4:
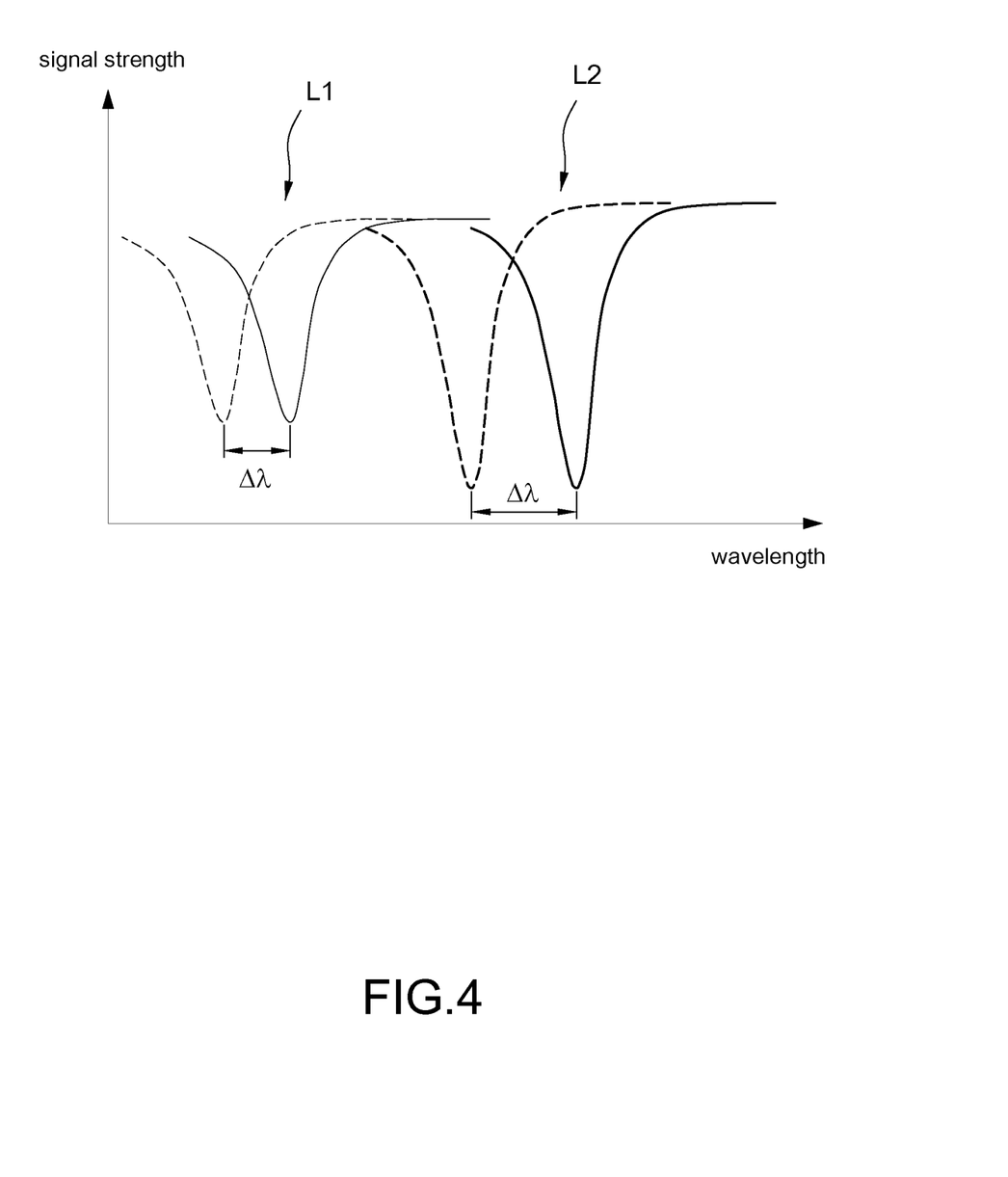
FIG. 4 is a schematic diagram of the sensitivity of a glycerin detection of the biological sensing system of the present disclosure.
Figure 5:
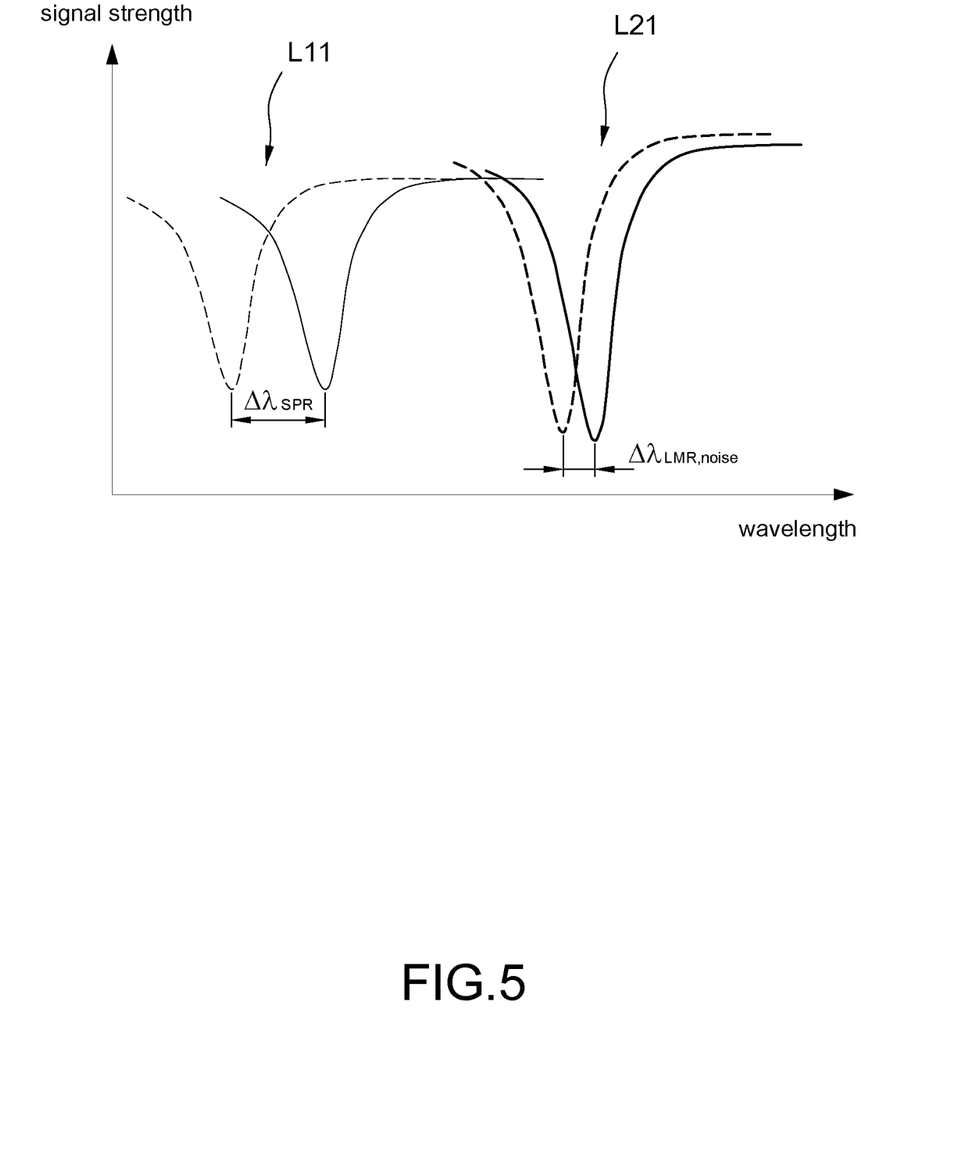
FIG. 5 is a schematic diagram of the sensitivity of a protein detection of the biological sensing system of the present disclosure.

Please refer to FIG. 3 to FIG. 5. FIG. 3 is a flowchart of a method of using the biological sensing system of the present disclosure. FIG. 4 is a schematic diagram of the sensitivity of a glycerin detection of the biological sensing system of the present disclosure. FIG. 5 is a schematic diagram of the sensitivity of a protein detection of the biological sensing system of the present disclosure. Please refer to previous description for other reference numbers, and the detail description is omitted here for conciseness.

When using the biological sensing apparatus 1, and the biological sensing system, first of all, the object (not shown) is arranged on the biological sensing area 13 including the SPR layer 20 and the LMR layer 30 side by side and not overlapped, and the object simultaneously contacts with the SPR layer 20 and the LMR layer 30 (step S1). Afterward, the incident light emitted by the broadband light source 2 (such as a halogen light source) inputs to the biological sensing area 13, the incident light generates an SPR signal on the SPR layer 20, and simultaneously the incident light generates an LMR signal on the LMR layer 30 (step S2). Finally, the spectrometer 5 receives the SPR signal and the LMR signal simultaneously through the output optical fiber 4, and subtracts the LMR signal from the SPR signal to obtain the biological signal (step S3). Since the resonance wavelength shift of the SPR signal contains two kinds of signals: biological signals and environmental interference signals, the purpose of removing the environmental interference signals in the SPR signal is achieved by subtracting the LMR signal that is completely dependent on the environment from the SPR signal.

As shown in FIG. 4, in the embodiment of the present disclosure, when the object is selected from different refractive indexes, the resonance wavelength shift of the SPR signal L1 (as shown left Δλ in FIG. 4) and the resonance wavelength shift of the LMR signal L2 (as shown right Δλ in FIG. 4) may be detected simultaneously. It is used to calculate the sensitivity of the SPR layer 20 and the sensitivity of the LMR layer 30 separately. In the embodiment of the present disclosure, the sensitivity of the SPR layer 20 is $S_{SPR}$, and the sensitivity of the LMR layer 30 is $S_{LMR}$.

As shown in FIG. 5, when the analyte is a protein, for example, a bovine serum albumin (BSA) solution is used. After detecting the SPR signal L11 and the LMR signal L21 simultaneously, the SPR layer 20 may capture proteins because of the surface modification (with biological probes), so the resonance wavelength shift of the SPR signal ($\Delta\lambda_{SPR}$) includes the resonance wavelength shift of the biological signal ($\Delta\lambda_{SPR,bio}$) and the resonance wavelength shift of the environmental interference signal ($\Delta\lambda_{SPR,noise}$). The LMR layer 30 may not capture proteins because it has not undergone surface modification (no biological probes), so only the resonance wavelength shift of environmental interference signals ($\Delta\lambda_{LMR,noise}$) may be used as reference data for environmental changes. For this reason, an equivalent refractive index change of the environmental interference signal ($\Delta n_{noise}$) and the resonance wavelength shift of the SPR signal ($\Delta\lambda_{SPR,\ noise}$) caused by the equivalent refractive index change may be calculated, which may be regarded as the amount of environmental interference in the SPR signal, as shown below:

$$\frac{\Delta\lambda_{LMR,noise}}{S_{LMR}} = \Delta n_{noise} = \frac{\Delta\lambda_{SPR,noise}}{S_{SPR}}$$

For this reason, the resonance wavelength shift of the real biological signal ($\Delta\lambda_{SPR,bio}$) may be obtained as shown below:

$$\Delta\lambda_{SPR,bio} = \Delta\lambda_{SPR} - \Delta\lambda_{SPR,noise}$$

The structure of the SPR layer 20 and the LMR layer 30 on the optical waveguide substrate 10 is used to form the biological sensing area 13, so as to avoid using a prime with huge volume. Further, the biological sensing area 13 obtains an SPR signal through the SPR layer 20, and simultaneously obtains an LMR signal through the LMR layer 30. Afterward, the spectrometer 5 subtracts the LMR signal from the SPR signal to obtain the biological signal, which may instantly remove the environmental interference signal. Therefore, the technical problems in prior art about miniaturization not easy to achieve and signal distortion easy to cause are solved.

For this reason, the biological sensing apparatus 1, the biological sensing system, and the method of using the same of the present disclosure achieve the purpose of convenient portability, easy mass production, and accurate biological sensing results.

In addition, LMR technology has the following characteristics compare with SPR technology: both TE wave and TM wave may resonate with the LMR layer 30. However, the SPR technology may only resonate with TM wave.

The above is only a detailed description and drawings of the preferred embodiments of the present disclosure, but the features of the present disclosure are not limited thereto, and are not intended to limit the present disclosure. All the scope of the present disclosure shall be subject to the scope of the following claims. The embodiments of the spirit of the present disclosure and its similar variations are intended to be included in the scope of the present disclosure. Any variation or modification that may be easily conceived by those skilled in the art in the field of the present disclosure may be covered by the following claims.

It should be understood that the structures, the proportions, the sizes, the number of components, and the like in the drawings are only used to cope with the contents disclosed in the specification for understanding and reading by those skilled in the art, and it is not intended to limit the conditions that may be implemented in the present disclosure, and thus is not technically significant. Any modification of the structure, the change of the proportional relationship, or the adjustment of the size, should be within the scope of the technical contents disclosed by the present disclosure without affecting the effects and the achievable effects of the present disclosure.

What is claimed is:

1. A biological sensing apparatus comprising:
an optical waveguide comprising:
a light input end, and
a light output end opposite to the light input end,
wherein, a biological sensing area is formed on one surface of the optical waveguide between the light input end and the light output end,
a surface plasmon resonance (SPR) layer comprising:
a metal layer arranged on part of the biological sensing area, and
a plurality of biological probes evenly arranged on the metal layer, and
a lossy mode resonance (LMR) layer arranged on part of the biological sensing area, and the LMR layer and the SPR layer being not overlapped,
wherein, the plurality of biological probes is formed on the metal layer through self-assembly after the metal layer is surface modified;
wherein the optical waveguide is a planar optical waveguide;
wherein the SPR layer and the LMR layer are side by side with each other and the metal layer of the SPR layer and the LMR layer are substantially coplanar with each other such that an object under test is simultaneously in contact with the SPR layer and the LMR layer;
wherein a resonance wavelength shift of a biological signal is calculated from a resonance wavelength shift of the SPR signal and a resonance wavelength shift of environmental interference signal.

2. The biological sensing apparatus as claimed in claim 1, wherein the biological sensing area is sequentially formed a first area and a second area along a direction from the light input end to the light output end, wherein the SPR layer is arranged on the first area, and the LMR layer is arranged on the second area.

3. The biological sensing apparatus as claimed in claim 1, wherein the LMR layer is formed of metal oxide or polymer material.

4. The biological sensing apparatus as claimed in claim 1, wherein the optical waveguide is one of glass, quartz, and polymer material.

5. A biological sensing system comprising:
a broadband light source,
an input optical fiber coupled to the broadband light source,
a biological sensing apparatus coupled to the input optical fiber, and the biological sensing apparatus comprising:
an optical waveguide comprising:
a light input end, and
a light output end opposite to the light input end,
wherein, a biological sensing area is formed on one surface of the optical waveguide between the light input end and the light output end,
a surface plasmon resonance (SPR) layer comprising:
a metal layer arranged on part of the biological sensing area, and
a plurality of biological probes evenly arranged on the metal layer, and
a lossy mode resonance (LMR) layer arranged on part of the biological sensing area, and the LMR layer and the SPR layer being not overlapped,
an output optical fiber coupled to the light output end, and
a spectrometer coupled to the output optical fiber,
wherein, the plurality of biological probes is formed on the metal layer through self-assembly after the metal layer is surface modified,
wherein, an incident light emitted by the broadband light source is configured to enter the optical waveguide through the input optical fiber for LMR in the biological sensing area;
wherein the optical waveguide is a planar optical waveguide;
wherein the SPR layer and the LMR layer are side by side with each other and the metal layer of the SPR layer and the LMR layer are substantially coplanar with each other such that an object under test is simultaneously in contact with the SPR layer and the LMR layer, and the spectrometer receives an SPR signal of the SPR layer and an LMR signal of the LMR layer simultaneously through the output optical fiber;
wherein a resonance wavelength shift of a biological signal is calculated from a resonance wavelength shift of the SPR signal and a resonance wavelength shift of environmental interference signal.

6. The biological sensing system as claimed in claim 5, wherein the biological sensing area is sequentially formed a first area and a second area along a direction from the light input end to the light output end, wherein the SPR layer is arranged on the first area, and the LMR layer is arranged on the second area.

7. The biological sensing system as claimed in claim 5, wherein the LMR layer is formed of metal oxide or polymer material.

8. A method of using a biological sensing system, comprising steps of:
- arranging an object on a biological sensing area comprising a surface plasmon resonance (SPR) layer and a lossy modal resonance (LMR) layer side by side and not overlapped, and the object configured to simultaneously contact with the SPR layer and the LMR layer,
- emitting, by a broadband light source, an incident light to input to the biological sensing area, the incident light configured to generate an SPR signal on the SPR layer, and simultaneously the incident light configured to generate an LMR signal on the LMR layer, and
- receiving, by a spectrometer, the SPR signal and the LMR signal simultaneously, and subtracting the LMR signal from the SPR signal to obtain a biological signal, wherein, the SPR layer comprises:
- a metal layer, and
- a plurality of biological probes is formed on the metal layer through self-assembly after the metal layer is surface modified;

wherein the optical waveguide is a planar optical waveguide;

wherein the metal layer of the SPR layer and the LMR layer are substantially coplanar with each other such that an object under test is simultaneously in contact with the SPR layer and the LMR layer, and the spectrometer receives the SPR signal of the SPR layer and the LMR signal of the LMR layer simultaneously through the output optical fiber;

wherein a resonance wavelength shift of the biological signal is calculated from a resonance wavelength shift of the SPR signal and a resonance wavelength shift of environmental interference signals.

9. The method of using the biological sensing system as claimed in claim 8, wherein the biological sensing area is sequentially formed a first area and a second area along a transmission direction of the incident light, wherein the SPR layer is arranged on the first area, and the LMR layer is arranged on the second area; the LMR layer is formed of metal oxide or polymer material.

* * * * *